United States Patent
Al-Roubaiey et al.

(10) Patent No.: US 10,499,309 B2
(45) Date of Patent: **\*Dec. 3, 2019**

(54) METHOD FOR ROUTING A MESSAGE AT A WIRELESS NODE IN A WIRELESS NETWORK

(71) Applicant: King Fahd University of Petroleum and Minerals, Dhahran (SA)

(72) Inventors: Anas Abdulwahid Al-Roubaiey, Dhahran (SA); Tarek R. Sheltami, Dhahran (SA); Ashraf S. Hasan Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,572

(22) Filed: Oct. 24, 2018

(65) Prior Publication Data

US 2019/0059040 A1 Feb. 21, 2019

Related U.S. Application Data

(63) Continuation of application No. 15/070,149, filed on Mar. 15, 2016, now Pat. No. 10,149,226.

(51) Int. Cl.
| | |
|---|---|
| *H04L 12/28* | (2006.01) |
| *H04W 40/22* | (2009.01) |
| *H04L 12/733* | (2013.01) |
| *H04L 12/721* | (2013.01) |
| *H04L 12/741* | (2013.01) |

(52) U.S. Cl.
CPC ............ *H04W 40/22* (2013.01); *H04L 45/06* (2013.01); *H04L 45/122* (2013.01); *H04L 45/74* (2013.01)

(58) Field of Classification Search
CPC ........................................................ H04L 12/28
USPC ........................................................ 370/329
See application file for complete search history.

(56) References Cited

U.S. PATENT DOCUMENTS

| 5,115,433 A | 5/1992 | Baran et al. |
| 7,945,658 B1 | 5/2011 | Nucci |
| 10,149,226 B2 * | 12/2018 | Al-Roubaiey ........ H04W 40/22 |
| 2012/0257506 A1 | 10/2012 | Bazlamacci |
| 2014/0328208 A1 | 11/2014 | Norige |

(Continued)

FOREIGN PATENT DOCUMENTS

| CN | 101577667 A | 11/2009 |
| WO | WO 2008/031049 A2 | 3/2008 |
| WO | WO 2008/031049 A3 | 3/2008 |

OTHER PUBLICATIONS

Khaled Day, et al., "Parallel Routing in Mobile Ad-Hoc Networks", International Journal of Computer Networks & Communications (IJCNC), vol. 3, No. 5, Sep. 2011, pp. 77-94.

*Primary Examiner* — Dang T Ton
(74) *Attorney, Agent, or Firm* — Oblon, McClelland, Maier & Neustadt, L.L.P.

(57) ABSTRACT

Aspects of the disclosure provide a wireless node in a wireless network with a grid topology for routing a message. The wireless node includes circuitry configured to receive a message including a destination node identification number, calculate a destination column and a destination row based on the destination node identification number, determine a next hop address based on the destination column and the destination row, and transmit the message including the next hop address to a next hop node.

6 Claims, 9 Drawing Sheets

(56) References Cited

U.S. PATENT DOCUMENTS

2017/0034053 A1 2/2017 Chanda
2018/0109453 A1* 4/2018 Dong .................... H04L 45/124

* cited by examiner

METHOD FOR ROUTING A MESSAGE AT A WIRELESS NODE IN A WIRELESS NETWORK

CROSS-REFERENCE TO RELATED APPLICATIONS

The present application is a Continuation of Ser. No. 15/070,149, now allowed, having a filing date of Mar. 15, 2016, the entire contents of which are incorporated herein by reference.

FIELD OF THE INVENTION

This disclosure relates to routing protocols in wireless sensor networks.

BACKGROUND OF THE INVENTION

In recent years there has been an interest in the development of ad-hoc networks, for example for monitoring inside or outside spaces. An ad-hoc network includes a set of autonomous nodes each of which includes a wireless transceiver and would also typically include a microprocessor and input or output devices for interfacing with the environment of the network. One important category of Ad-Hoc networks is wireless sensor networks. Wireless sensor networks can be used indoors or outdoors for safety (e.g., fire detection), security (e.g., intruder detection) or routine operations (e.g., HVAC) applications for example.

Wireless sensor networks are sometimes designed to be self-powered by including a battery or environmental energy harvesting (e.g., solar panel) device, so the power available for operating each node of the wireless sensor network may be limited. Setting up an ad-hoc network involves discovery of routes to all other nodes in the network which typically involves flooding the network with special route discovery messages and may be energy intensive. Additionally routing tables must be maintained in memory.

It would be desirable to have a routing protocol for wireless sensor networks that avoids the need for route discovery and for maintaining routing tables.

SUMMARY OF THE INVENTION

Aspects of the disclosure provide a wireless node in a wireless network with a grid topology for routing a message. The wireless node includes circuitry configured to receive a message including a destination node identification number $D_{ID}$, calculate a destination column $D_C$ and a destination row $D_R$ based on the destination node identification number, determine a next hop address based on the destination column $D_C$ and the destination row $D_R$, and transmit the message including the next hop address to a next hop node.

In an embodiment, the circuitry is configured to calculate the destination column $D_C$ by evaluating:

$$D_C = D_{ID} \bmod N,$$

where N is a number of logical columns into which the wireless network is divided, and calculate the destination row $D_R$ by evaluating:

$$D_R = \text{floor}(D_{ID}/N),$$

where N is a number of logical columns into which the wireless is divided.

In an example, the circuitry is configured to:
in a first case that the destination column $D_C$ is equal to a column of the wireless node $S_C$ and the destination identification number $D_{ID}$ is greater than a source identification number $S_{ID}$ of the wireless node, set a next hop address to $S_{ID}-N$;

in a second case that the destination column $D_C$ is equal to the column of the wireless node $S_C$ and the destination identification number $D_{ID}$ is less than the source identification number $S_{ID}$ of the wireless node, set the next hop address to $S_{ID}-N$;

in a third case that the destination row $D_R$ is equal to a row of the wireless node $S_R$ and the destination identification number $D_{ID}$ is greater than the source identification number $S_{ID}$ of the wireless node, set the next hop address to $S_{ID}+1$;

in a fourth case that the destination row $D_R$ is equal to the row of the wireless node $S_R$ and the destination identification number $D_{ID}$ is less than the source identification number $S_{ID}$ of the wireless node, set the next hop address to $S_{ID}-1$; wherein the first case, the second case, the third case and the fourth case are checked prior to checking a fifth case, a sixth case, a seventh case and an eight case;

in the fifth case that the destination column $D_C$ is greater than the column of the wireless node $S_C$ and the destination identification number $D_{ID}$ is greater than the source identification number $S_{ID}$ of the wireless node, set the next hop address to $S_{ID}+N+1$;

in the sixth case that the destination column $D_C$ is greater than the column of the wireless node $S_C$ and the destination identification number $D_{ID}$ is less than the source identification number $S_{ID}$ of the wireless node, set the next hop address to $S_{ID}-N+1$;

in the seventh case that the destination column $D_C$ is less than the column of the wireless node $S_C$ and the destination identification number $D_{ID}$ is greater than the source identification number $S_{ID}$ of the wireless node, set the next hop address to $S_{ID}-N-1$; and in the eighth case that the destination column $D_C$ is less than the column of the wireless node $S_C$ and the destination identification number $D_{ID}$ is less than the source identification number $S_{ID}$ of the wireless node, set the next hop address to $S_{ID}-N-1$.

In an example, the wireless network has a three dimensional (3D) topology, and the circuitry is further configured to calculate a destination level $D_L$ from the destination node identification number $D_{ID}$.

In the example, the circuitry is configured to calculate the destination column $D_C$ by evaluating:

$$D_C = D_{ID} \bmod N$$

where, N is a number of logical columns into which the wireless network is divided, calculate the destination row $D_R$ by evaluating $$D_R = (\text{floor}(D_{ID}/N)) \bmod M$$

where, M is a number of logical rows into which the wireless network is divided, and calculate the destination level $D_L$ by evaluating:

$$DL = \text{floor}(D_{ID}/(NM)).$$

In the example, the circuitry is configured to:
in a first case that the destination level $D_L$ is equal to a source level $S_L$ of the wireless node AND the destination column $D_C$ is equal to a source column $S_C$ of the wireless node AND either the destination row $D_R$ is greater than a source row $S_R$ of the wireless node OR a destination ID $D_{ID}$ is greater than a source ID $S_{ID}$, set a next hop address to a source ID of the wireless node to $S_{ID}$ plus N;

in a second case that the destination level $D_L$ is equal to the source level $S_L$ of the wireless node AND the destination column $D_C$ is equal to the source column $S_C$ of the wireless node AND either the destination row $D_R$ is less than the source row $S_R$ of the wireless node OR the destination ID $D_{ID}$ is less than the source ID $S_{ID}$, set the next hop address to the source ID of the wireless node to $S_{ID}$ minus N;

in a third case that the destination level $D_L$ is equal to the source level $S_C$ of the wireless node AND the destination row $D_R$ is equal to the source row $S_R$ of the wireless node AND either the destination column $D_C$ is greater than the source column $S_C$ of the wireless node OR the destination ID $D_{ID}$ is greater than the source ID $S_{ID}$, set the next hop address to the source ID of the wireless node to $S_{ID}$ plus 1;

in a fourth case that the destination level $D_L$ is equal to the source level $S_L$ of the wireless node AND the destination row $D_R$ is equal to the source row $S_R$ of the wireless node AND either the destination column $D_C$ is less than the source column $S_C$ of the wireless node OR the destination ID $D_{ID}$ is less than the source ID $S_{ID}$, set the next hop address to the source ID of the wireless node to $S_{ID}$ minus 1;

in a fifth case that the destination level $D_L$ is equal to the source level $S_L$ of the wireless node AND the destination column $D_C$ is greater than the source column $S_C$ of the wireless node AND the destination row $D_R$ is less than the source row $S_R$ of the wireless node, set the next hop address to the source ID of the wireless node $S_{ID}$ plus N plus 1;

in a sixth case that the destination level $D_L$ is equal to the source level $S_L$ of the wireless node AND the destination column $D_C$ is greater than the source column $S_C$ of the wireless node AND the destination row $D_R$ is less than the source row $S_R$ of the wireless node, set the next hop address to the source ID of the wireless node to $S_{ID}$ minus N plus 1;

in a seventh case that the destination level $D_L$ is equal to the source level $S_L$ of the wireless node AND the destination column $D_C$ is less than the source column $S_C$ of the wireless node AND the destination row $D_R$ is greater than the source row $S_R$ of the wireless node, set the next hop address to the source ID of the wireless node to $S_{ID}$ plus N minus 1;

in an eighth case that the destination level $D_L$ is equal to the source level $S_L$ of the wireless node AND the destination column $D_C$ is less than the source column $S_C$ of the wireless node AND the destination row $D_R$ is less than the source row $S_R$ of the wireless node, set the next hop address to the source ID of the wireless node to $S_{ID}$ minus N minus 1;

in a ninth case that the destination column $D_C$ is equal to the source column $S_C$ of the wireless node AND the destination row $D_R$ is equal to the source row $S_R$ of the wireless node AND either destination level $D_L$ is greater than the source level $S_L$ of the wireless node OR the destination ID $D_{ID}$ is greater than the source ID $S_{ID}$, set the next hop address to the source ID of the wireless node to $S_{ID}$ plus NM;

in a tenth case that the destination column $D_C$ is equal to the source column $S_C$ of the wireless node AND the destination row $D_R$ is equal to the source row $S_R$ of the wireless node AND either destination level $D_L$ is less than the source level $S_L$ of the wireless node OR the destination ID $D_{ID}$ is less than the source ID $S_{ID}$, set the next hop address to the source ID of the wireless node to $S_{ID}$ minus NM;

in an eleventh case that the destination level $D_L$ is greater than the source level $S_L$ of the wireless node AND the destination column $D_C$ is greater than the source column $S_C$ of the wireless node AND the destination row $D_R$ is greater than the source row $S_R$ of the wireless node, set the next hop address to the source ID of the wireless node to $S_{ID}$ plus NM plus N plus 1;

in an twelfth case that the destination level $D_L$ is greater than the source level $S_L$ of the wireless node AND the destination column $D_C$ is greater than the source column $S_C$ of the wireless node AND the destination row $D_R$ is less than the source row $S_R$ of the wireless node, set the next hop address to the source ID of the wireless node to $S_{ID}$ plus NM minus N plus 1;

in an thirteenth case that the destination level $D_L$ is greater than the source level $S_L$ of the wireless node AND the destination column $D_C$ is less than the source column $S_C$ of the wireless node AND the destination row $D_R$ is greater than the source row $S_R$ of the wireless node, set the next hop address to the source ID of the wireless node to $S_{ID}$ plus NM plus N minus 1;

in a fourteenth case that the destination level $D_L$ is greater than the source level $S_L$ of the wireless node AND the destination column $D_C$ is less than the source column $S_C$ of the wireless node AND the destination row $D_R$ is less than the source row $S_R$ of the wireless node, set the next hop address to the source ID of the wireless node to $S_{ID}$ plus NM minus N minus 1;

in a fifteenth case that the destination level $D_L$ is less than the source level $S_L$ of the wireless node AND the destination column $D_C$ is greater than the source column $S_C$ of the wireless node AND the destination row $D_R$ is greater than the source row $S_R$ of the wireless node, set the next hop address to the source ID of the wireless node to $S_{ID}$ minus NM plus N plus 1;

in a sixteenth case that the destination level $D_L$ is less than the source level $S_L$ of the wireless node AND the destination column $D_C$ is greater than the source column $S_C$ of the wireless node AND the destination row $D_R$ is less than the source row $S_R$ of the wireless node, set the next hop address to the source ID of the wireless node to $S_{ID}$ minus NM minus N plus 1;

in a seventeenth case that the destination level $D_L$ is less than the source level $S_L$ of the wireless node AND the destination column $D_C$ is less than the source column $S_C$ of the wireless node AND the destination row $D_R$ is greater than the source row $S_R$ of the wireless node, set the next hop address to the source ID of the wireless node to $S_{ID}$ minus NM plus N minus 1;

in an eighteenth case that the destination level $D_L$ is less than the source level $S_L$ of the wireless node AND the destination column $D_C$ is less than the source column $S_C$ of the wireless node AND the destination row $D_R$ is less than the source row $S_R$ of the wireless node, set the next hop address to the source ID of the wireless node to $S_{ID}$ minus NM minus N minus 1;

in a nineteenth case that the destination level $D_L$ is greater than the source level $S_L$ of the wireless node AND the destination column $D_C$ is equal to the source column $S_C$ of the wireless node AND the destination row $D_R$ is greater than the source row $S_R$ of the wireless node, set the next hop address to the source ID of the wireless node to $S_{ID}$ plus NM plus N;

in a twentieth case that the destination level $D_L$ is greater than the source level $S_L$ of the wireless node AND the destination column $D_C$ is equal to the source column $S_C$ of the wireless node AND the destination row $D_R$ is less than the source row $S_R$ of the wireless node, set the next hop address to the source ID of the wireless node to $S_{ID}$ plus NM minus N;

in a twenty first case that the destination level $D_L$ is less than the source level $S_L$ of the wireless node AND the destination column $D_C$ is equal to the source column $S_C$ of the wireless node AND the destination row $D_R$ is greater than the source row $S_R$ of the wireless node, set the next hop address to the source ID of the wireless node $S_{ID}$ minus NM plus N;

in a twenty second case that the destination Level $D_L$ is less than the source level $S_L$ of the wireless node AND the destination column $D_C$ is equal to the source column $S_C$ of the wireless node AND the destination row $D_R$ is less than the source row $S_R$ of the wireless node, set the next hop address to the source ID of the wireless node $S_{ID}$ minus NM minus N;

in a twenty third case that the destination level $D_L$ is greater than the source level $S_L$ of the wireless node AND the destination column $D_C$ is greater than the source column $S_C$ of the wireless node AND the destination row $D_R$ is equal to the source row $S_R$ of the wireless node, set the next hop address to the source ID of the wireless node $S_{ID}$ plus NM plus 1;

in a twenty fourth case that the destination level $D_L$ is less than the source level $S_L$ of the wireless node AND the destination column $D_C$ is greater than the source column $S_C$ of the wireless node AND the destination row $D_R$ is equal to the source row $S_R$ of the wireless node, set the next hop address to the source ID of the wireless node $S_{ID}$ plus NM minus 1;

in a twenty fifth case that the destination level $D_L$ is less than the source level $S_L$ of the wireless node AND the destination column $D_C$ is greater than the source column $S_C$ of the wireless node AND the destination row $D_R$ is equal to the source row $S_R$ of the wireless node, set the next hop address to the source ID of the wireless node $S_{ID}$ minus NM plus 1; and in a twenty sixth case that the destination level $D_L$ is less than the source level SL of the wireless node AND the destination column $D_C$ is less than the source column SC of the wireless node AND the destination row $D_R$ is equal to the source row $S_R$ of the wireless node, set the next hop address to the source ID of the wireless node $S_{ID}$ minus NM minus 1.

Aspects of the disclosure provide a method for routing a message at a wireless node in a wireless network having a grid topology. The method includes receiving a message including a destination node identification number, $D_{ID}$, calculating a destination column $D_C$ and a destination row $D_R$ based on the destination node identification number, $D_{ID}$, determining a next hop address based on the destination column $D_C$ and the destination row $D_R$, and transmitting the message including the next hop address to a next hop node.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
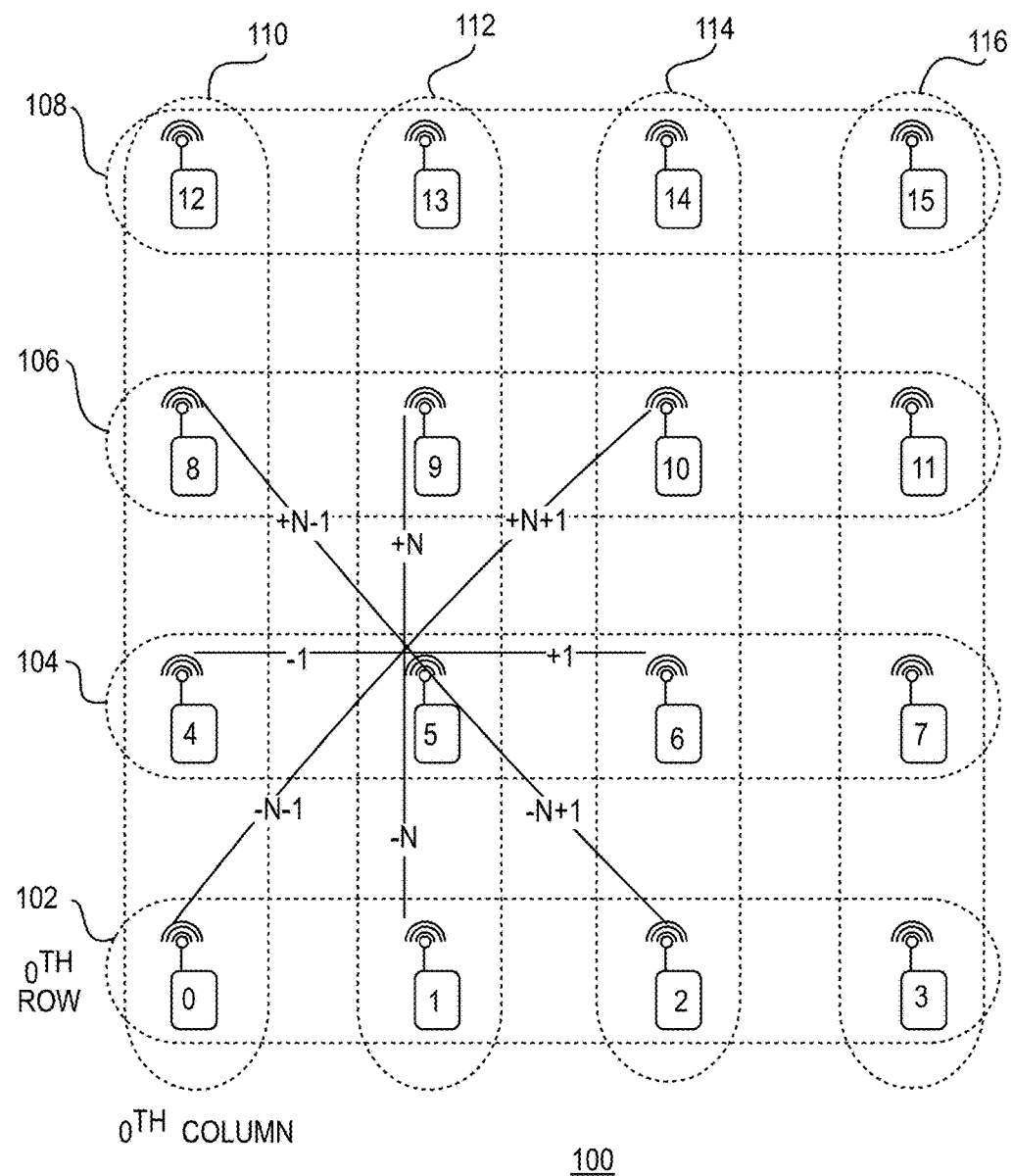
FIG. 1 shows a wireless network including wireless nodes arranged in a grid according to an embodiment of the disclosure.

Referring now to the drawings, wherein like reference numerals designate identical or corresponding parts throughout the several views.

FIG. 1 shows a wireless network 100 including sixteen wireless nodes 0-15 arranged in a grid according to an embodiment of the disclosure. The grid includes four rows 102, 104, 106, 108 including a zeroth row 102, a first row 104, a second row 106 and a third row 108. The grid includes four columns 110, 112, 114, 116 including a zeroth column 110, a first column 112, a second column 114, and a third column 116. Alternatively, networks according to the present teachings can have an arbitrary number of rows greater than one and an arbitrary number of columns greater than one. As shown in FIG. 1 the zeroth row 102 is the lowermost row and the zeroth column is the leftmost column. Alternatively the rows can he numbered from top to bottom and alternatively the columns can be numbered from right to left.

The nodes 0-15 are numbered sequentially from a first node corresponding to the zeroth column to a last node corresponding to the last column in each row, and from the zeroth row to the last row in the grid. Accordingly, the number assigned to each node 0-15 is referred to as an identification number (ID) of the corresponding node. For example, node 0 in FIG. 1 has an ID of 0, and node 10 has an ID of 10.

Each node 0-15 has a number of neighbor nodes including nodes in the diagonal direction. For example, as shown in FIG. 1, the node 5 has eight neighbor nodes 0-4, and 6-10, and nodes 1, 2, 8, and 10 are nodes in the diagonal direction from the node 5. Each node 0-15 transmits and receives wireless signals to communicate with its neighbor nodes, and transmission range of each node 0-15 covers its neighbor nodes including nodes in the diagonal direction.

In one example, the wireless network 100 is a wireless sensor network (WSN). Generally, a WSN includes spatially distributed autonomous sensors to monitor physical or environmental conditions, such as temperature, sound, pressure, etc. and to cooperatively pass their data through the network to a main location. A WSN is built of nodes from a few to several hundreds or thousands, where each node is connected to one or more sensors.

In an embodiment, the wireless network 100 is a WSN where data is transmitted from any source node to destination node. In addition, data is included in a message when transmitted from a source node to a destination node. During a process of message transmission, a message that includes an ID of the destination node (represented as $D_{ID}$) as a destination address is first generated at the source node, then routed along a route including a sequential of nodes, and finally reaches a destination node.

During the process, after generating or receiving the message, each node along the route except the destination node needs to make a next hop decision to select a node from its neighbor node as the next hop node. A node that receives a message and is currently making a next hop decision in the process is referred to as a current node. After the next hop node is selected, the ID of the next hop node (referred to as a next hop ID, also referred to as a next hop address) is included in the message, and the current node transmits a wireless signal including the message. The neighbor nodes of the current node receive the wireless signal, and each check the next hop ID included in the message. Consequently, a node whose ID is the same as the next hop ID in the message knows itself is the next hop node, and can start to make another hop decision to forward the message.

According to an aspect of the disclosure, the wireless network 100 uses an ID-based routing protocol to make next hop decision in order to route a message through the wireless network 100 from a source node to a destination node. In this ID-based routing protocol, each node along the route can determine a next hop ID based on an ID of the current node, referred to as a source ID, and represented as $S_{ID}$, and a destination ID. $D_{ID}$ of the destination node. Specifically, a current node can first calculate a destination column, represented as $D_C$, and a destination row, represented as $D_R$, based on the $D_{ID}$ of the destination node. The $D_C$ refers to the ordinal number of the column of the destination node, and $D_R$ refers to the ordinal number of the row of the destination node. Then, the current node can compare the $D_C$ and $D_R$ with a source column, represented as $S_C$, and a source row, represented as $S_R$ to determine a next hop ID, where the $S_C$ refers to the ordinal number of the column of the current node, and the $S_R$ refers to the ordinal number of the row of the current node. The next hop ID is subsequently included in the message and used as an address of the next hop node.

Figure 2:
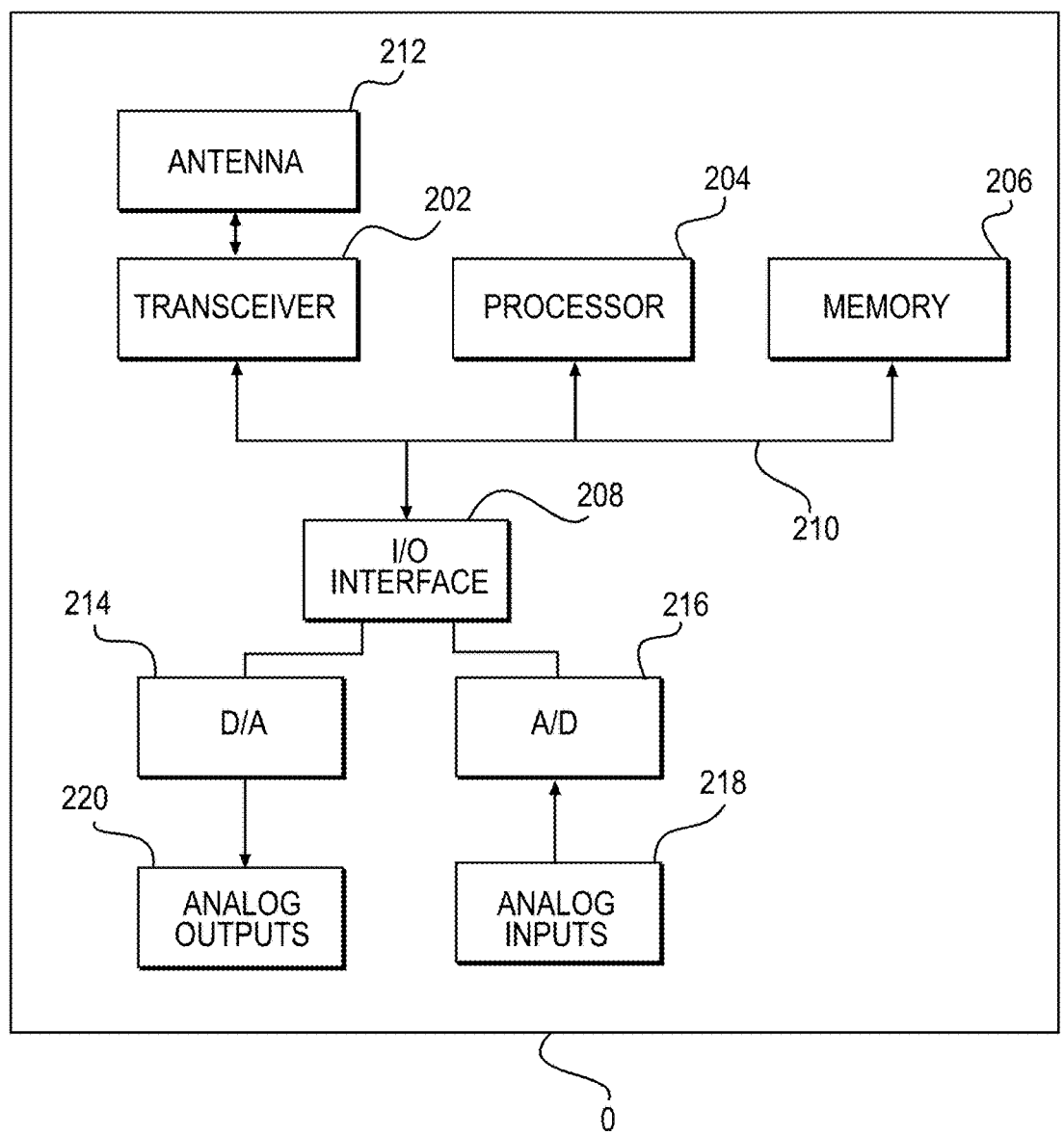
FIG. 2 is a block diagram of one of the wireless nodes of the wireless network shown in FIG. 1.

FIG. 2 is a block diagram of the zeroth node 0 of the wireless network 100 shown in FIG. 1. The other nodes 1-15 of the wireless network 100 can have the same or a different design. The zeroth node 0 includes a transceiver 202, a microprocessor 204, a memory 206, an input/output (I/O) interface 208 coupled together through a signal bus 210. The transceiver 202 is coupled to an antenna 212. The I/O interface 208 is coupled to a digital-to-analog converter (D/A) 214 and an analog-to-digital converter (A/D) 216. Analog inputs 218, such as, for example, sensor inputs, are coupled to the A/D 216. Analog outputs 220, such as, for example, servomotors are coupled to the D/A 214. A program that is described below with reference to FIGS. 5-6 that is used to route messages in the network 100 is stored in the memory 206 and executed by the microprocessor 204. The memory 206 is one form of computer readable medium. Alternatively, an Application Specific Integrated Circuit (ASIC), a Field Programmable Gate Array (FPGA), a microcontroller, or other circuitry can be used in lieu of the microprocessor 204 and memory 206.

Figure 3:
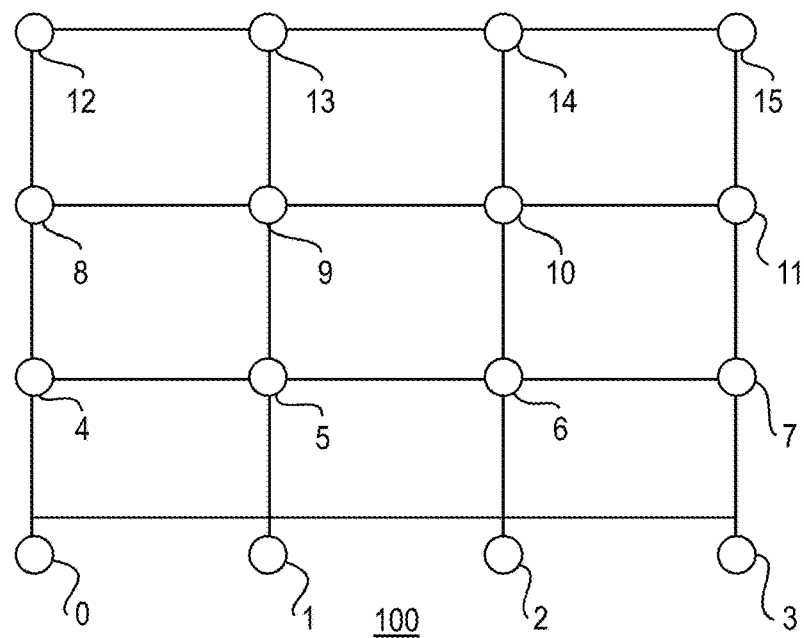
FIG. 3 is a schematic representation of the network shown in FIG. 1.
Figure 4:
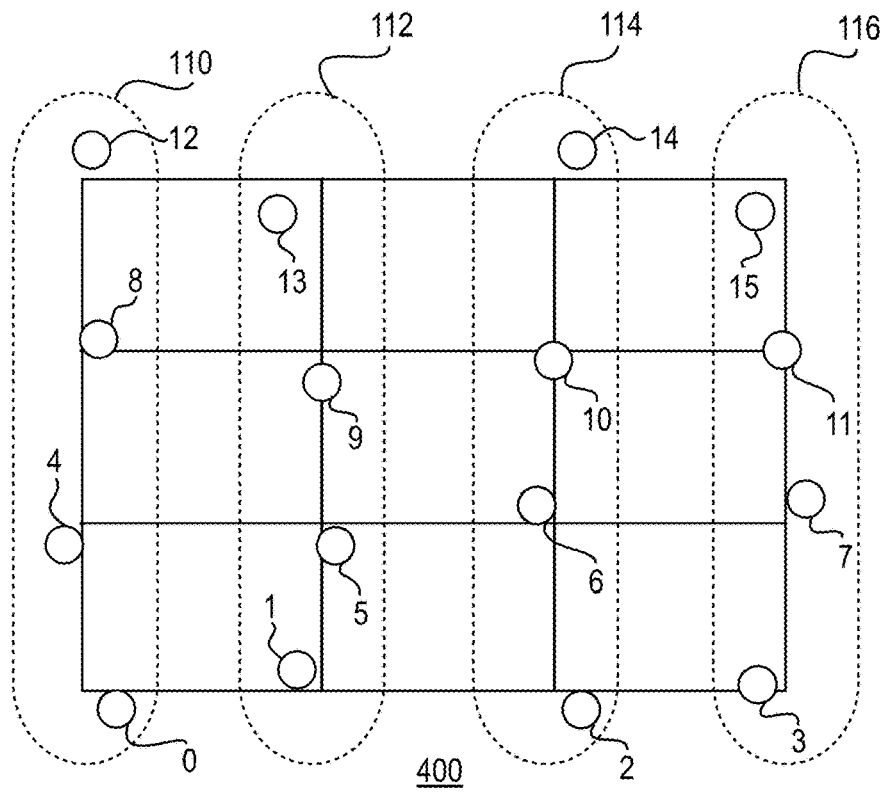
FIG. 4 is a schematic representation of a network according to an alternative implementation.

FIG. 3 is a schematic representation of the network shown in FIG. 1. As shown in FIG. 3 the wireless nodes 0-15 are laid out precisely in a grid pattern. In practice the locations of the wireless nodes 0-15 can deviate somewhat from the precise grid pattern shown in FIG. 3 as long as the each of the wireless nodes 0-15 is within communication range of its neighboring nodes. For example, FIG. 4 shows a case of a wireless network 400 where although the positions of the wireless nodes 0-15 deviate somewhat from the position of the precise grid layout the same routing protocol that is conceptually based on the grid layout in FIG. 3 and is described below with reference to FIGS. 5-6 can be used. In the network 400 although the nodes 0-15 are not exactly aligned in columns the nodes grouped in columns 110, 112, 114, 116 can still be treated as logical columns for the purpose of the routing process 500 described below with reference to FIGS. 5-6. It will be appreciated that one can rotate the wireless networks 100, 400 by ninety degrees in which case the "columns" will extend sideways without altering the functioning of the routing process 500 described below with reference to FIGS. 5-6. In a real world implementation it makes no difference whether the logical columns extend North to South, East to West, down to up or any other direction.

Figure 5:
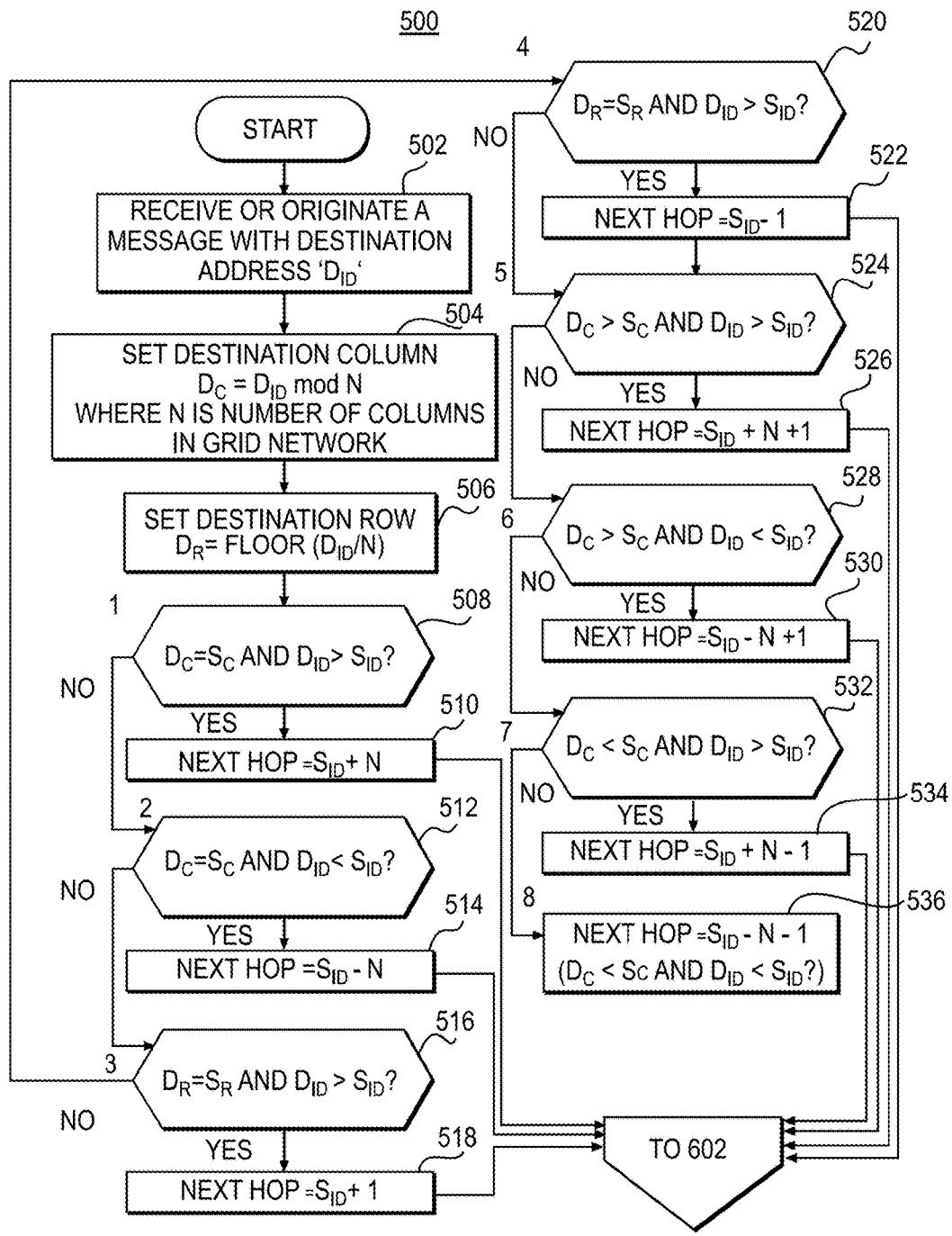
FIG. 5 is a first part of a flowchart of a process for routing messages in networks shown in FIGS. 1, 3, 4.
Figure 6:
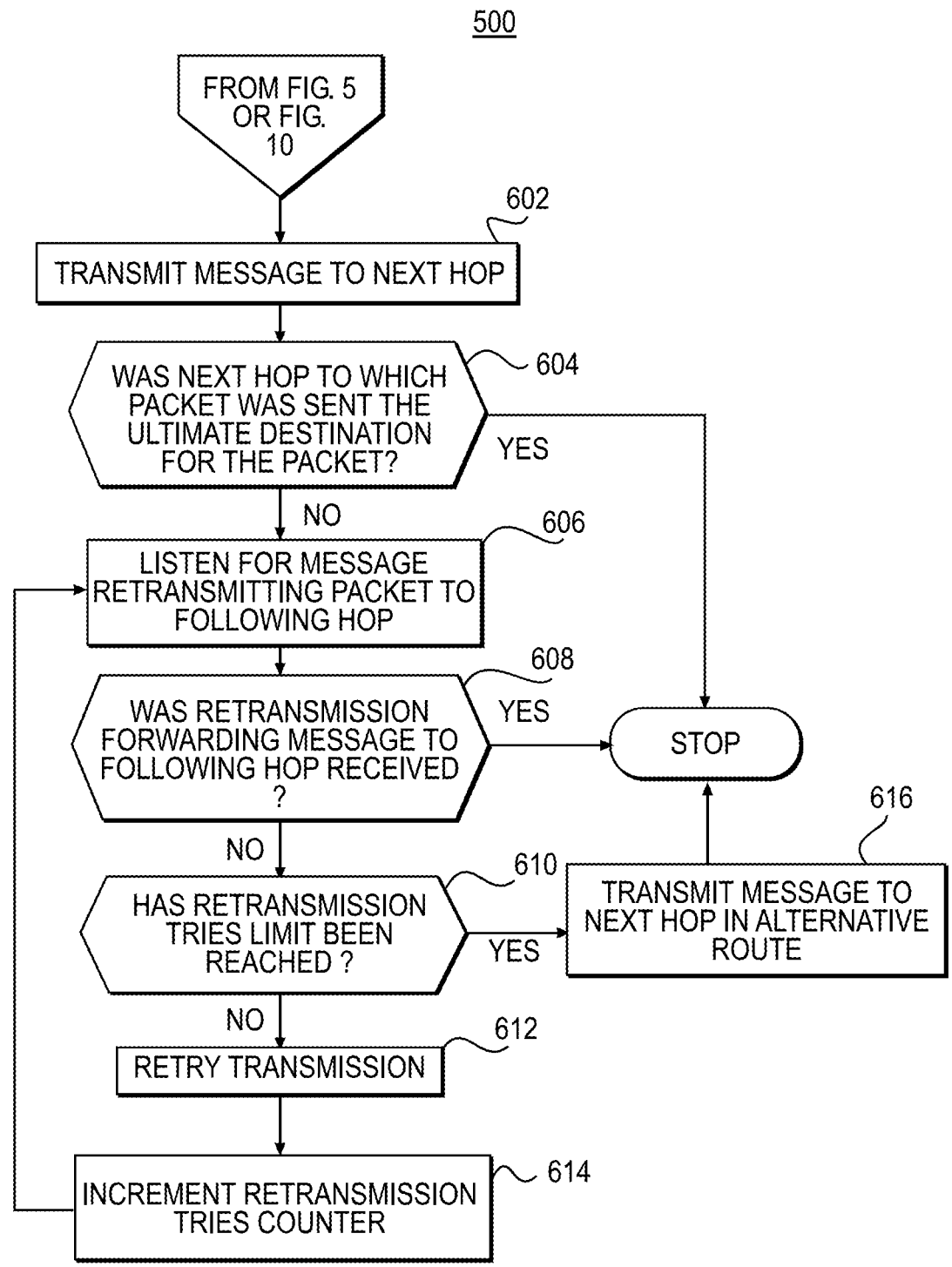
FIG. 6 is a second part of the flowchart of the process for routing messages in the networks shown in FIGS. 1, 3, 4.

FIGS. 5-6 show a flowchart of a process 500 of routing messages in networks shown in FIGS. 1, 3, 4. The process 500 is executed by each of wireless nodes, e.g., 1-15 in the network e.g., 100, 400 in order to route messages. For convenience in describing the process 500, unless otherwise stated, it will be assumed that process 500 is being executed by a $K^{TH}$ wireless node, where K stands for any node identification number (ID). In block 502 a message which has a destination address denoted $D_{ID}$ is either received by the $K^{TH}$ wireless node or originated in the wireless node. In the context of the networks 100, 400 $D_{ID}$ stands for one of the node IDs 0-15. The process 500 of routing messages is not dependent on whether the message is being originated or forwarded. In a sense the process 500 is stateless. In block 504 the destination column is set according to equation 1 below:

$$D_C = D_{ID} \bmod N \qquad \text{EQU. 1}$$

where, Dc is the destination node's column, $D_{ID}$ is defined above, and N is the number of logical columns in the grid of the wireless network.

The mod function computes the remainder after dividing the first argument $D_{ID}$ by the second argument N. In block 506 the destination row is set according to equation 2 below:

$$D_R = \text{floor}(D_{ID}/N) \qquad \text{EQU. 2}$$

where $D_R$ is the destination node's row, $D_{ID}$ is defined above, and N is defined above.

The floor function computes the greatest integer that is less than its argument which in equation 2 is the quotient $D_{ID}/N$. After executing block 506 the process 500 proceeds to decision block 508 which tests if the destination column $D_C$ is equal to the source column $S_C$ AND (in this specification AND in all caps is a Boolean AND) the destination ID $D_{ID}$ is greater than the source ID $S_{ID}$. Note that each wireless node 0-15 suitably has its node ID $S_{ID}$, i.e., one of the numbers 0-15 stored in its memory. For the purpose of executing process 500 each node's node ID is the source ID $S_{ID}$. If the outcome of decision block 508 is positive then in block 510 the next hop address is set to $S_{ID}+N$. With reference to FIG. 1, assuming the process 500 is being executed by the fifth wireless node 5 the aforementioned outcome of decision block 508 corresponds to the line (representing a hop) labeled −N that extends from the fifth wireless node 5 to the ninth wireless node 9. For example, the outcome of decision block 508 would be positive if the source ID $S_{ID}$ is five the destination ID $D_{ID}$ is nine or thirteen.

If, on the other hand, the outcome of decision block 508 is negative, then the process 500 branches to decision block 512 the outcome of which depends on whether the destination column $D_C$ is equal to the source column $S_C$ AND the destination ID $D_{ID}$ is less than the source ID $S_{ID}$. If the outcome of decision block 512 is positive then in block 514 the next hop address is set to $S_{ID}$−N. With reference to FIG. 1, assuming the process 500 is being executed by the fifth wireless node 5 the aforementioned outcome of decision block 512 corresponds to the line (representing a hop) labeled −N that extends from the fifth wireless node 5 to the first wireless node 1. For example, the outcome of decision block 512 would be positive if the source ID $S_{ID}$ is five the destination ID $D_{ID}$ is two.

If, on the other hand, the outcome of decision block 512 is negative, then the process 500 branches to decision block 516 the outcome of which depends on whether the destination row $D_R$ is equal to the source row $S_R$ AND the destination ID $D_{ID}$ is greater than the source ID $S_{ID}$. If the outcome of decision block 516 is positive then in block 518 the next hop address is set to $S_{ID}$+1. With reference to FIG. 1, assuming the process 500 is being executed by the fifth wireless node 5 the aforementioned outcome of decision block 516 corresponds to the line (representing a hop) labeled +1 that extends from the fifth wireless node 5 to the sixth wireless node 6. For example, the outcome of decision block 516 would be positive if the source ID $S_{ID}$ is five the destination ID $D_{ID}$ is six or seven.

If, on the other hand, the outcome of decision block 516 is negative, then the process 500 branches to decision block 520 the outcome of which depends on whether the destination row $D_R$ is equal to the source row $S_R$ AND the destination ID $D_{ID}$ is less than the source ID $S_{ID}$. If the outcome of decision block 520 is positive then in block 522 the next hop address is set to $S_{ID}$−1. With reference to FIG. 1, assuming the process 500 is being executed by the fifth wireless node 5 the aforementioned outcome of decision block 520 corresponds to the line (representing a hop) labeled −1 that extends from the fifth wireless node 5 to the fourth wireless node 4. For example, the outcome of decision block 520 would be positive if the source ID $S_{ID}$ is five the destination ID $D_{ID}$ is four.

If, on the other hand, the outcome of decision block 520 is negative, then the process 500 branches to decision block 524 the outcome of which depends on whether the destination column $D_C$ is greater than the source column $S_C$ AND the destination ID $D_{ID}$ is greater than the source ID $S_{ID}$. Note that that the inequality tests in decision blocks 524, 528, 532 could also be met by combinations of $D_C$, $S_C$, $D_{ID}$ and $S_{ID}$ values that satisfy the inequality tests in decision blocks 508, 512, 516, 520, for example the inequality tests of block 524 could be met for a combination of values also satisfying block 516 however those cases will trigger positive outcomes of one of decision blocks 508, 512, 516, 520 which will lead to blocks 524, 528, 532 being bypassed. None of decision blocks 524, 528, 532 will be evaluated in cases in which the outcome of any of decision blocks 508, 512, 516 and 520 is positive. So the outcome of all of the decision blocks 508, 512, 516 and 520 must be negative for any of the decision blocks 524, 528, 532 to be reached and evaluated. If the outcome of decision block 524 is positive then in block 526 the next hop address is set to $S_{ID}$+N+1. With reference to FIG. 1, assuming the process 500 is being executed by the fifth wireless node 5 the aforementioned outcome of decision block 524 corresponds to the line (representing a hop) labeled +N−1 that extends from the fifth wireless node 5 to the tenth wireless node 10. For example, the outcome of decision block 524 would be positive if the source ID $S_{ID}$ is live the destination ID $D_{ID}$ is ten, eleven fourteen or fifteen.

If, on the other hand, the outcome of decision block 524 is negative, then the process 500 branches to decision block 528 the outcome of which depends on whether the destination column $D_C$ is greater than the source column $S_C$ AND the destination ID $D_{ID}$ is less than the source ID $S_{ID}$. If the outcome of decision block 528 is positive then in block 530 the next hop address is set to $S_{ID}$−N−1. With reference to FIG. 1, assuming the process 500 is being executed by the fifth wireless node 5 the aforementioned outcome of decision block 528 corresponds to the line (representing a hop) labeled 1 that extends from the fifth wireless node 5 to the second wireless node 2. For example, the outcome of decision block 528 would be positive if the source ID $S_{ID}$ is five the destination ID $D_{ID}$ is two or three.

If, on the other hand, the outcome of decision block 528 is negative, then the process 500 branches to decision block 532 the outcome of which depends on whether the destination column $D_C$ is less than the source column $S_C$ AND the destination ID $D_{ID}$ is greater than the source ID $S_{ID}$. If the outcome of decision block 532 is positive then in block 534 the next hop address is set to $S_{ID}$−N−1. With reference to FIG. 1, assuming the process 500 is being executed by the fifth wireless node 5 the aforementioned outcome of decision block 532 corresponds to the line (representing a hop) labeled N−1 that extends from the fifth wireless node 5 to the eighth wireless node 8. For example, the outcome of decision block 532 would be positive lithe source ID $S_{ID}$ is five the destination ID $D_{ID}$ is eight or twelve.

If the outcome of decision block 532 is negative then in block 536 the next hop address is set to SID−N−1. The negative outcome of block 532 corresponds to the case in which $D_C$ is less than the source column $S_C$ AND the destination ID $D_{ID}$ is less than the source ID $S_{ID}$. With reference to FIG. 1, assuming the process 500 is being executed by the fifth wireless node 5 the aforementioned outcome of decision block 532 corresponds to the line (representing a hop) labeled −N−1 that extends from the fifth wireless node 5 to the zeroth wireless node 0.

After executing either block 510, block 514, block 518, block 522, block 526, block 530, block 534 or block 536 the process 500 continues with block 602 in FIG. 6 in which the message which was received or originated in block 502 is transmitted to a next hop which was determined in blocks 504-536 as described above.

Next, the process 500 proceeds to decision block 604 the outcome of which depends on whether the next hop "Next Hop" wireless nodes was the destination node identified as $D_{ID}$.

If the outcome of decision block 604 is positive then the process 500 terminates and will be re-executed to handle each new message that is received or originated per block 502. Alternatively, each $K^{TH}$ device executing the process 500 could be configured to await acknowledgement of receipt (an ACK message) from the destination node $D_{ID}$ before terminating.

If on the other hand the outcome of decision block 604 is negative, then the process 500 proceeds to block 606 in which the $K^{TH}$ device will listen for retransmission by the wireless node to which the message was sent in block 602. In block 606 the $K^{TH}$ device is in operating in a promiscuous listen-only mode. The process 500 then proceeds to decision block 608 the outcome of which depends on whether the $K^{TH}$ node detected retransmission of the message that was transmitted in block 602. If the outcome of decision block 608 is positive then the process 500 terminates and will be re-executed when a new message is received or originated in block 502.

If on the other hand the outcome of decision block 608 is negative meaning that retransmission was not detected, then the process 500 proceeds to decision block 610 the outcome of which depends on whether a preprogrammed retransmission tries limit has been reached. If the outcome of decision block 610 is negative, the process 500 proceeds to decision block 612 in which the $K^{TH}$ device retries the transmission performed in block 602 and thereafter in block 614 increments a retransmission tries counter. Note that in block 610 a current value of the retransmission tries counter (at the time of execution of block 610) is compared to the aforementioned preprogrammed retransmission limit. After executing block 614 the process loops back to block 606 and continues executing as previously described.

When the outcome of block 610 is affirmative meaning that the retransmission tries limit has been reached, the process 500 branches to block 616 in which the message is transmitted to a different node other than the node identified in blocks 504-536. The aforementioned different node may be a next hop in an equally short route or a next shortest route.

Figure 7:
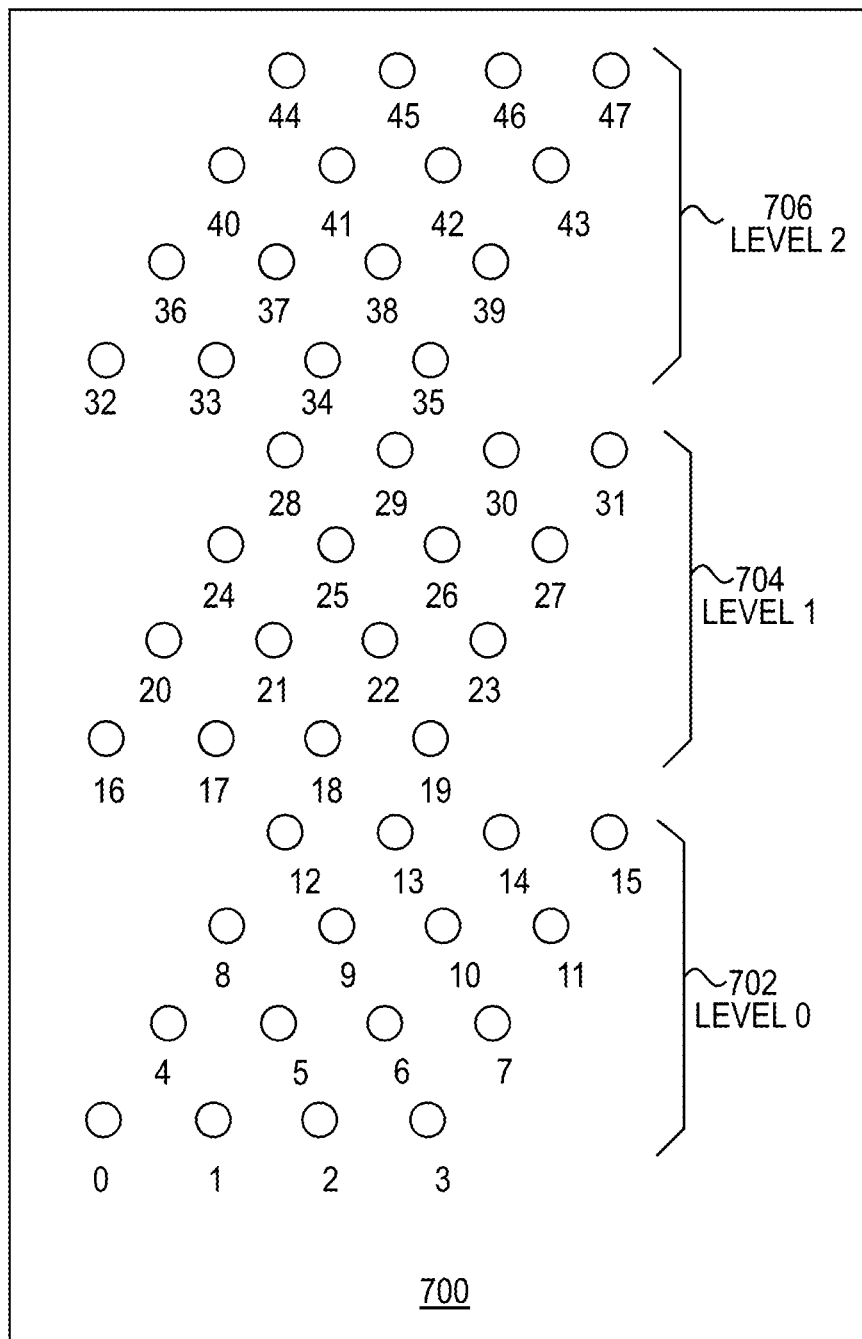
FIG. 7 is a schematic representation of wireless network including wireless nodes arranged in a 3-D grid according to an embodiment of the disclosure.

FIG. 7 is a schematic representation of wireless network 700 including wireless nodes arranged in a 3-D grid according to an embodiment of the disclosure. The wireless network 700 includes three levels 702, 704, 706 including a zeroth level 702, a first level 704, and a second level 706. In this exemplary embodiment there are 48 wireless nodes numbered 0 to 47. Each of the three levels 702, 704, 706 includes 16 nodes arranged in a grid pattern. The zeroth level 702 includes nodes 0-15, the first level 704 includes nodes 16-31 and the second level 706 includes nodes 32-47. The nodes are numbered sequentially proceeding left-to-right starting with a zeroth row (which in the depiction in FIG. 7 is the foreground row) and proceeding through successive rows returning to the left-most wireless node to start the enumeration within each row from the zeroth level 702 to the second level 706. Accordingly, the number assigned to each node is referred to as an identification number (ID) of the corresponding node. The columns within each level 702, 704, 706 are numbered sequentially starting at the zeroth column which is the left most column in each level. The numbering of the columns and rows in the levels 702, 704, 706 of the wireless network is the same as the numbering of the columns and rows in the wireless network 100 which is described above with reference to FIG. 1. 3-D grid wireless networks according to embodiment of the present disclosure can by referred to as M×N×L where M is the number of rows in each level, N is the number of columns in each level and L is the number of levels. As shown in FIG. 7 the number of rows in each level M is equal to 4 the number of columns in each level N is equal to 4 and the number of levels is equal to 3, however this is but one example, and M, N, and L can take on any integer values greater than 1.

Each node in the wireless network 700 has a number of neighbor nodes including nodes in the direction of cube diagonals. For example, the node 22 in the first level 704 has 26 neighbor nodes including 1-3, 5-7, 1-11, 17-19, 21, 23, 25-27, 33-35, 37-39, and 41-43. These 26 neighbor nodes and the node 22 form a cube with the eight nodes 1, 3, 9, 11, 33, 35, 41, and 43 as the vertexes of the cube. Each node in the wireless network 700 transmits and receives wireless signals to communicate with its neighbor nodes, and transmission range of each node covers its neighbor nodes including nodes in the direction of cube diagonal, such as the eight vertexes in the above example.

In an embodiment, the wireless network 700 is a WSN where data is transmitted from any source node to destination node. In addition, data is included in a message when transmitted from a source node to a destination node. During a process of message transmission, a message that includes an ID of the destination node (represented as $D_{ID}$) as a destination address is first generated at the source node, then routed along a route including a sequential of nodes, and finally reaches a destination node.

During the process, after generating or receiving the message, each node along the route except the destination node needs to make a next hop decision to select a node from its neighbor node as the next hop node. A node that receives a message and is currently making a next hop decision in the process is referred to as a current node. After the next hop node is selected, the ID of the next hop node (referred to as a next hop ID, and also referred to as a next hop address) is included in the message, and the current node transmits a wireless signal including the message. The neighbor nodes of the current node receive the wireless signal, and each check the next hop ID included in the message. Consequently, a node whose ID is the same as the next hop ID in the message knows itself is the next hop node, and can start to make another hop decision to forward the message.

According to an aspect of the disclosure, the wireless network 700 uses an ID-based routing protocol to make next hop decision in order to route a message through the wireless network 700 from a source node to a destination node. In this ID-based routing protocol, each node along the route can determine a next hop ID based on an ID of the current node, referred to as a source ID, and represented as $S_{ID}$, and a destination ID, $D_{ID}$ of the destination node. Specifically, a current node can first calculate a destination column, represented as $D_C$, a destination row, represented as $D_R$, and a destination level, represented as $D_L$, based on the $D_{ID}$ of the destination node. The $D_C$ refers to the ordinal number of the column of the destination node, $D_R$ refers to the ordinal number of the row of the destination node, and $D_L$ refers to the ordinal number of the level of the destination node. Then, the current node can compare the $D_C$, $D_R$, and $D_L$ with a source column, represented as $S_C$, a source row, represented as $S_R$, and a source level, represented as $D_L$ to determine a next hop ID, where the $S_C$ refers to the ordinal number of the column of the current node, the $S_R$ refers to the ordinal number of the row of the current node, and the $S_L$ refers to the ordinal number of the level of the current node.

Figure 8:
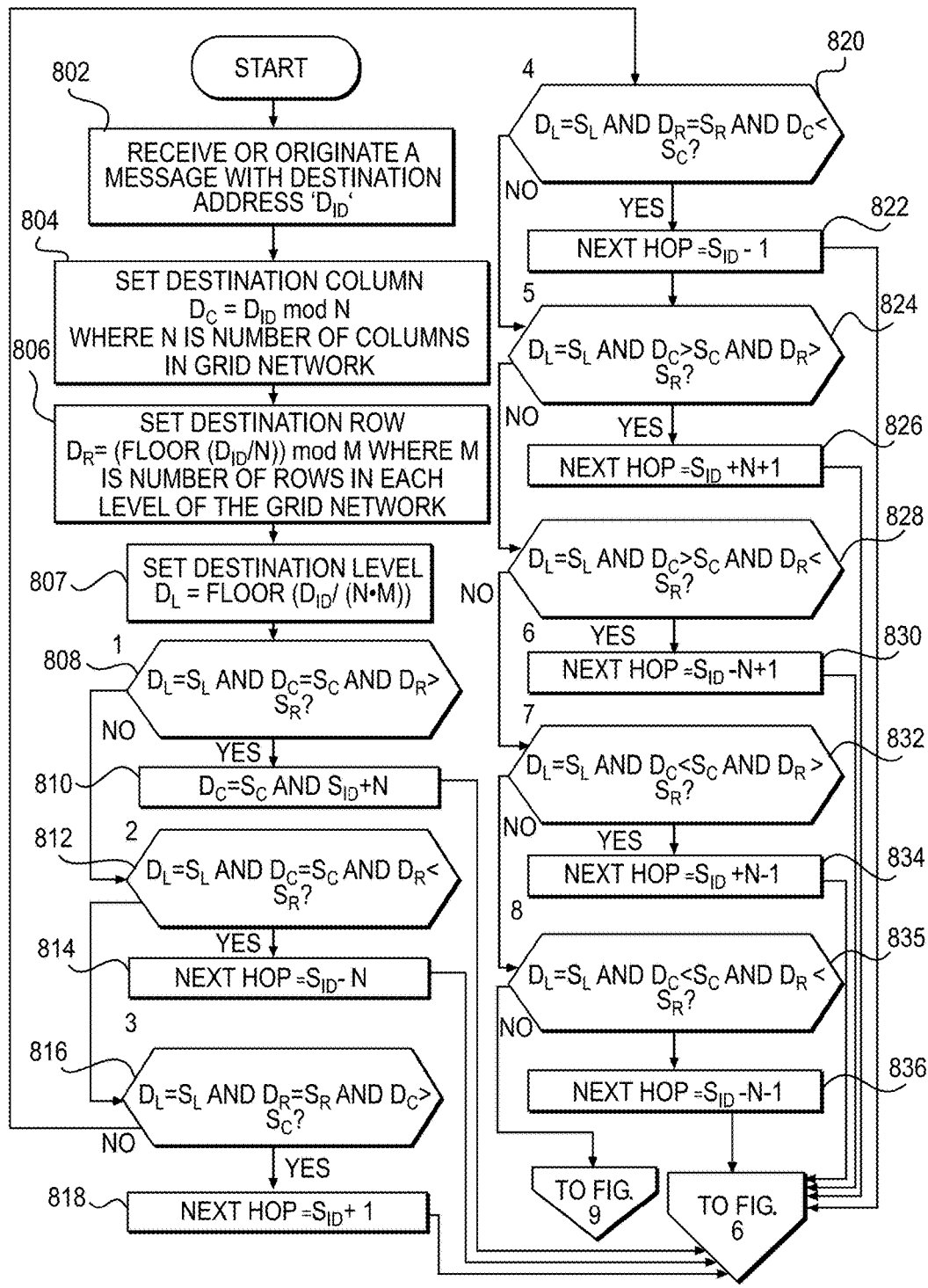
FIG. 8 is a first part of a flowchart of a process for routing messages in the 3-D grid wireless network represented in FIG. 7.
Figure 9:
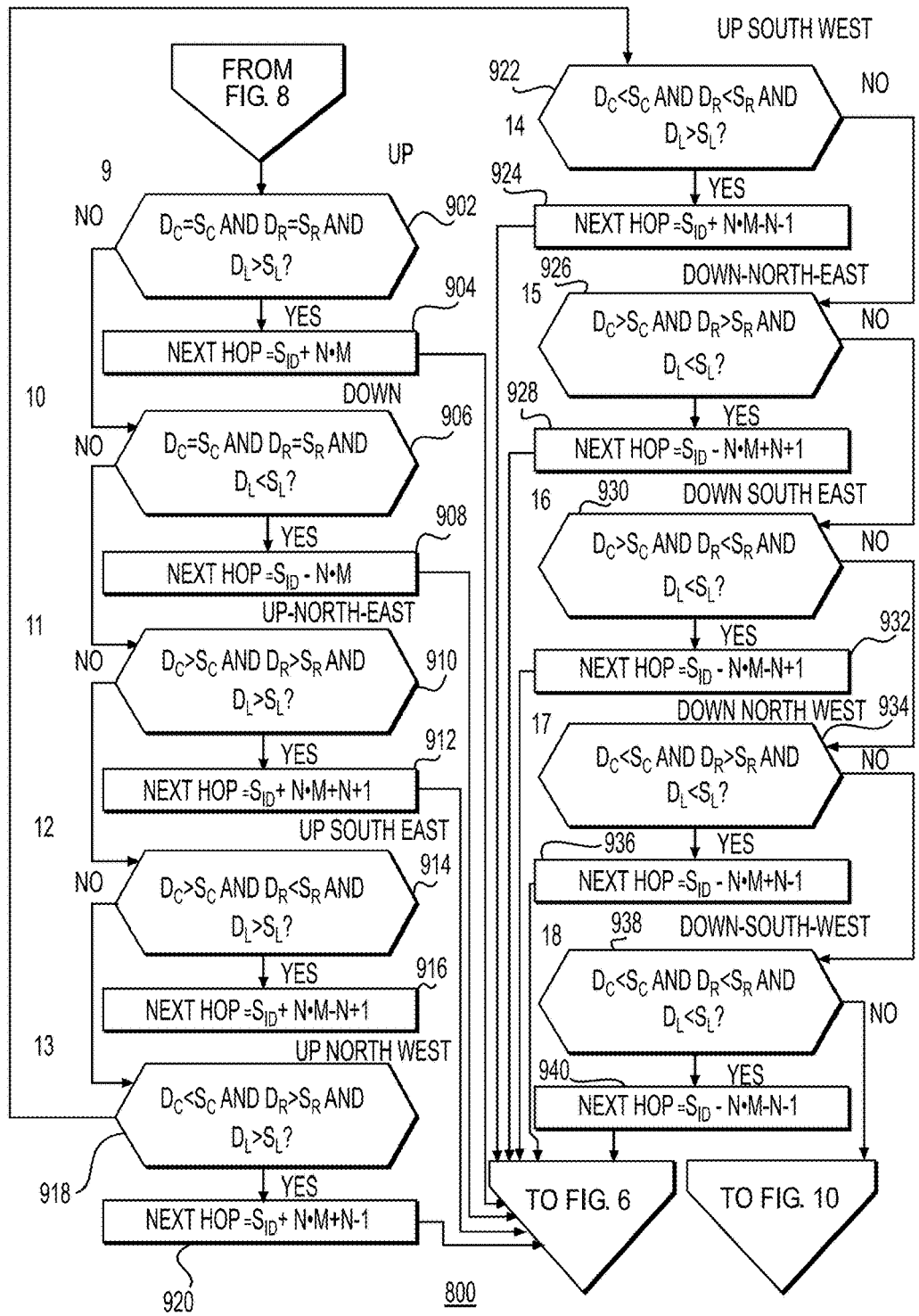
FIG. 9 is a second part of the process for routing messages in the 3-D grid wireless network represented in FIG. 7.
Figure 10:
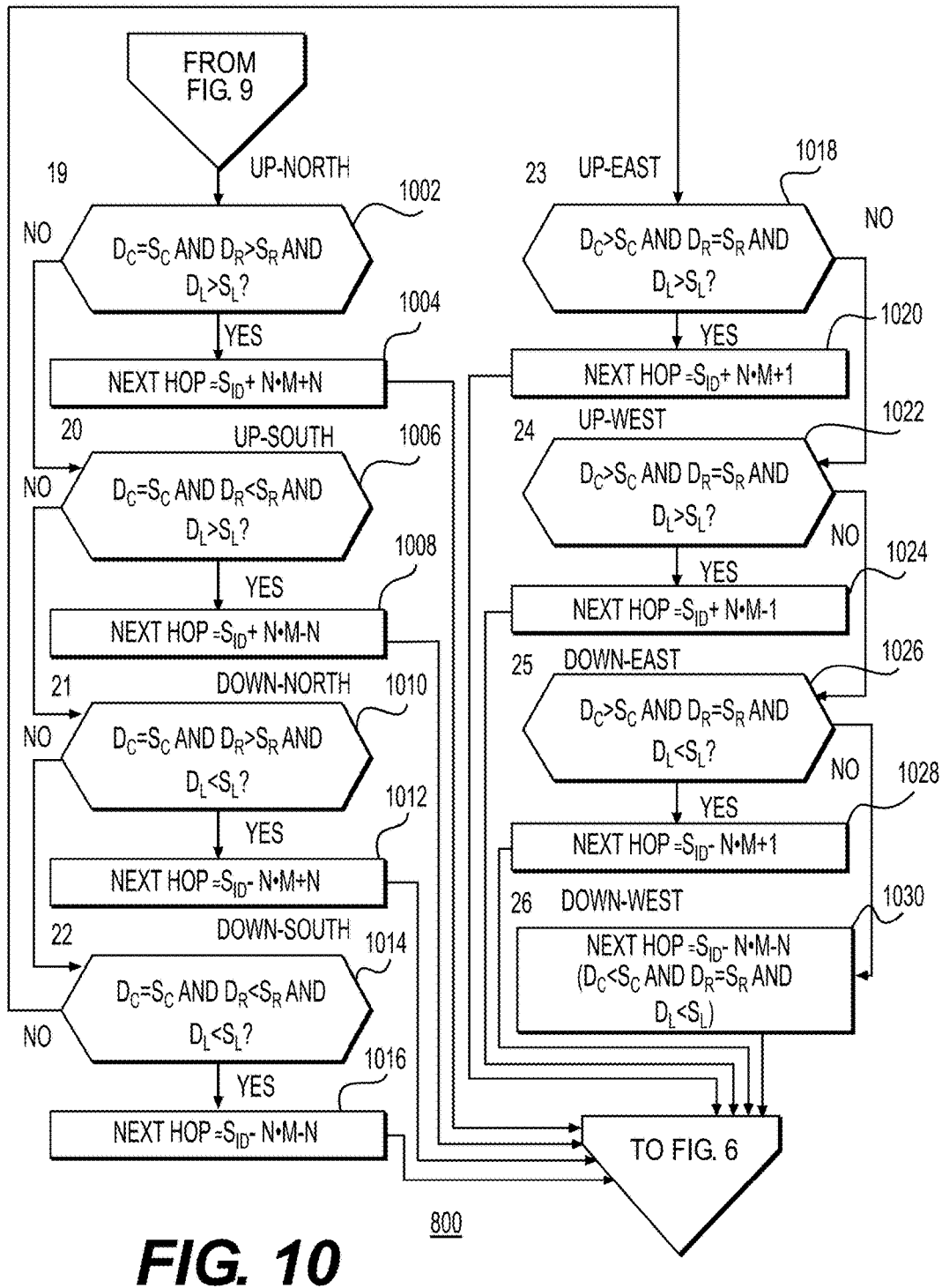
FIG. 10 is a third part of the process for routing messages in the 3-D grid wireless network represented in FIG. 7.

FIG. 8-10 are three parts of a flowchart of a process 800 of routing messages in the 3-D grid wireless network 700 represented in FIG. 7. The process 800 is executed by each wireless nodes 0-47 in the 3-D grid wireless network 700 in order to route messages. The same process 800 is used by a node whether it is originating a message or merely forwarding the message. The process 800 will be described below from the perspective of a $K^{TH}$ wireless node executing the process where K stands for an integer identifying the wireless node. In block 802 a message is received or originated by the KTH wireless node. The message includes a destination ID $D_{ID}$. In block 804 the destination column is set according to equation 1 given above. Note that no adjustment of equation 1 is required for the 3-D case. Next in block 806 the destination row $D_R$ is calculated according to equation 3 given below:

$$D_R = (\text{floor}(D_{ID}/N)) \bmod M \quad \text{EQU. 3}$$

Next in block 807 the destination level $D_L$ is calculated according to equation 4 given below:

$$D_L = \text{floor}(D_{ID}/(NM)) \quad \text{EQU. 4}$$

Note that each $K^{TH}$ wireless node includes (e.g., stored in memory) the values of N and M. Furthermore each $K^{TH}$ wireless node includes (e.g., stored in memory) information indicating its own column $S_C$, information indicating its own row $S_R$ and information indicating its own level $S_L$, or includes (e.g., stored in memory) its own ID $S_{ID}$ and by substituting $S_{ID}$ for the $D_{ID}$ in equations 1, 3, 4 each $K^{TH}$ wireless node can calculate from equations 1, 3, 4 respectively its own column $S_C$, its own row $S_R$ and its own level $S_L$. In the context of process 800 $S_C$, $S_R$ and $S_L$ are referred to respectively as the source column, source row and source level.

Referring again to FIG. 8, decision block 808 test if the destination level $D_L$ is equal to the source level $S_L$ AND the destination column $D_C$ is equal to the source column $S_C$ and the destination row $D_R$ is greater than the source row $S_R$. If the outcome of block 808 is positive the process proceeds to block 810 in which a next hop address (for the message that was received or originated in block 802) is set to the source ID plus N ($S_{ID}$+N).

If the outcome of decision block 808 is negative the process 800 proceeds to decision block 812 which tests if the destination level $D_L$ is equal to the source level $S_L$ AND the destination column $D_C$ is equal to the source column $S_C$ AND the destination ID $D_{ID}$ is less than the source ID $S_{ID}$. If the outcome of decision block 808 is positive the process 800 proceeds to block 814 in which the next hop address is set to the source ID minus N ($S_{ID}$−N).

If the outcome of decision block 812 is negative, the process 800 proceeds to decision block 816 which tests if the destination level $D_L$ is equal to the source level $S_L$ AND the destination row $D_R$ is equal to the source row $S_R$ and the destination ID $D_{ID}$ is greater than the source ID $S_{ID}$. If the outcome of decision block 816 is positive, the process proceeds to block 818 in which the next hop address is set to the source ID plus 1 ($S_{ID}$+1).

If the outcome of decision block 816 is negative, the process 800 proceeds to decision block 820 which tests if the destination level DL is equal to the source level $S_L$ AND the destination row $D_R$ is equal to the source row $S_R$ AND the destination ID is less than the source ID $S_{ID}$. If the outcome of decision block 820 is positive, the process 800 proceeds to block 822 in which the next hop address is set to source ID minus 1 (SID−1).

If the outcome of decision block 820 is negative, the process 800 proceeds to decision block 824 which tests if the destination level $D_L$ is equal to the source level $S_L$ AND the destination column $D_C$ is greater than the source column $S_C$ AND the destination row $D_R$ is greater than the source row $S_R$. If the outcome of decision block 824 is positive, the process 800 proceeds to block 826 in which the next hop address is set to the source ID plus N plus 1 ($S_{ID}$+N+1).

If the outcome of decision block 824 is negative, the process proceeds to decision block 828 which tests if the destination level DL is equal to the source level $S_L$ AND the destination column $D_C$ is greater than the source column $S_C$ AND the destination row $D_R$ is less than the source row $S_R$. If the outcome of decision block 828 is positive, the process 800 proceeds to block 830 in which the next hop address is set to the source ID minus N plus 1 ($S_{ID}$−N+1).

If the outcome of decision block 828 is negative, the process 800 proceeds to decision block 832 which tests if the destination level $D_L$ is equal to the source level $S_L$ AND the destination column $D_C$ is less than the source column $S_C$ and the destination row $D_R$ is greater than the source row $S_R$. If the outcome of decision block 832 is positive, the process 800 proceeds to block 834 in which the next hop address is set to the source ID plus N minus 1 ($S_{ID}$+N−1).

If the outcome of decision block 832 is negative, the process 800 proceeds to decision block 835 which tests if the destination level $D_L$ is equal to the source level $S_L$ AND the destination column $D_C$ is less than the source column $S_C$ AND the destination row $D_R$ is less than the source row $S_R$. If the outcome of decision block 835 is positive then the process 800 proceeds to block 836 in which the next hop address is set to the source ID minus N−1 ($S_{ID}$−N−1).

If the outcome of decision block 835 is negative, the process 800 proceeds to decision block 902 (FIG. 9) which tests if the destination column $D_C$ is equal to the source column $S_C$ AND the destination row $D_R$ is equal to the source row $S_R$ AND the destination level $D_L$ is greater than to the source level $S_L$. If the outcome of decision block 902 is positive then the process 800 proceeds to block 904 in which the next hop address is set to the source ID plus N times M ($S_{ID}$+NM).

If the outcome of decision block 902 is negative, the process 800 proceeds to decision block 906 which tests if the destination column $D_C$ is equal to the source column $S_C$ AND the destination row $D_R$ is equal to the source row $S_R$ AND the destination level $D_L$ is less than to the source level $S_L$. If the outcome of decision block 906 is positive then the process 800 proceeds to block 908 in which the next hop address is set to the source ID minus N times M ($S_{ID}$−NM).

If the outcome of decision block 906 is negative, the process 800 proceeds to decision block 910 which tests if the destination column $D_C$ is greater than the source column $S_C$ AND the destination row $D_R$ is greater than the source row $S_R$ AND the destination level $D_L$ is greater than to the source level $S_L$. If the outcome of decision block 910 is positive then the process 800 proceeds to block 912 in which the next hop address is set to the source ID plus N times M plus N plus one ($S_{ID}$+NM−N−1).

Note that the conditional statements in blocks 808, 812, 816, 820, 902, and 906 include a single inequality. According to an alternative embodiment in in the inequalities in these blocks 808, 812, 816, 820, 902, and 906 the quantity corresponding to the source, e.g., $S_C$, $S_R$, $S_L$ is replaced by the source ID $S_{ID}$ and the quantity corresponding to the destination, e.g., $D_C$, $D_R$, $D_L$ is replaced by the destination ID $D_{ID}$.

If the outcome of decision block 910 is negative, the process 800 proceeds to decision block 914 which tests if the destination column $D_C$ is greater than the source column $S_C$ AND the destination row $D_R$ is less than the source row $S_R$ AND the destination level $D_L$ is greater than to the source level S. If the outcome of decision block 914 is positive then the process 800 proceeds to block 916 in which the next hop address is set to the source ID plus N times M plus minus N plus one ($S_{ID}$+NM+N+1).

If the outcome of decision block 914 is negative, the process 800 proceeds to decision block 918 which tests if the destination column $D_C$ is less than the source column $S_C$ AND the destination row $D_R$ is greater than the source row $S_R$ AND the destination level $D_L$ is greater than to the source level $S_L$. If the outcome of decision block 918 is positive then the process 800 proceeds to block 920 in which the next hop address is set to the source ID plus N times M plus N minus one ($S_{ID}$+NM+N−1).

If the outcome of decision block 918 is negative, the process 800 proceeds to decision block 922 which tests if the destination column $D_C$ is less than the source column $S_C$ AND the destination row $D_R$ is less than the source row $S_R$ AND the destination level $D_L$ is greater than to the source level $S_L$. If the outcome of decision block 922 is positive then the process 800 proceeds to block 924 in which the next hop address is set to the source ID plus N times M minus N minus one ($S_{ID}$+NM−N−1).

If the outcome of decision block 922 is negative, the process 800 proceeds to decision block 926 which tests if the destination column $D_C$ is greater than the source column $S_C$ AND the destination row $D_R$ is greater than the source row $S_R$ AND the destination level $D_L$ is less than to the source level $S_L$. If the outcome or decision block 926 is positive then the process 800 proceeds to block 928 in which the next hop address is set to the source ID minus N times M plus N plus one ($S_{ID}$−NM+N+1).

If the outcome of decision block 926 is negative, the process 800 proceeds to decision block 930 which tests if the destination column $D_C$ is greater than the source column $S_C$ AND the destination row $D_R$ is less than the source row $S_R$ AND the destination level $D_L$ is less than to the source level $S_L$. If the outcome of decision block 930 is positive then the process 800 proceeds to block 932 in which the next hop address is set to the source ID minus N tunes M minus N plus one ($S_{ID}$−NM−N+1).

If the outcome of decision block 930 is negative, the process 800 proceeds to decision block 934 which tests if the destination column $D_C$ is less than the source column $S_C$ AND the destination row $D_R$ is greater than the source row $S_R$ AND the destination level $D_L$ is less than to the source level $S_L$. If the outcome of decision block 934 is positive then the process 800 proceeds to block 936 in which the next hop address is set to the source ID minus N times M plus N minus one ($S_{ID}$−NM+N−1).

If the outcome of decision block 934 is negative, the process 800 proceeds to decision block 938 which tests if the destination column $D_C$ is less than the source column $S_C$ AND the destination row $D_R$ is less than the source row $S_R$ AND the destination level $D_L$ is less than to the source level $S_L$. If the outcome of decision block 938 is positive then the process 800 proceeds to block 940 in which the next hop address is set to the source ID minus N times M minus N minus one ($S_{ID}$−NM−N−1).

If the outcome of decision block 938 is negative, the process 800 proceeds to decision block 1002 (FIG. 10) which tests if the destination column $D_C$ is equal to the source column $S_C$ AND the destination row $D_R$ is greater than the source row $S_R$ AND the destination level $D_L$ is greater than to the source level $S_L$. If the outcome of decision block 1002 is positive then the process 800 proceeds to block 1004 in which the next hop address is set to the source ID plus N times M plus N ($S_{ID}$+NM−N).

If the outcome of decision block 1002 is negative, the process 800 proceeds to decision block 1006 which tests if the destination column $D_C$ is equal to the source column $S_C$ AND the destination row $D_R$ is less than the source row $S_R$ AND the destination level $D_L$ is greater than to the source level $S_L$. If the outcome of decision block 1006 is positive then the process 800 proceeds to block 1008 in which the next hop address is set to the source ID plus N times M minus N ($S_{ID}$+NM−N).

If the outcome of decision block 1006 is negative, the process 800 proceeds to decision block 1010 which tests if the destination column $D_C$ is equal to the source column $S_C$ AND the destination row $D_R$ is greater than the source row $S_R$ AND the destination level $D_L$ is less than to the source level $S_L$. If the outcome of decision block 1010 is positive then the process 800 proceeds to block 1012 in which the next hop address is set to the source ID minus N times M plus N ($S_{ID}$−NM+N).

If the outcome of decision block 1010 is negative, the process 800 proceeds to decision block 1014 which tests if the destination column $D_C$ is equal to the source column $S_C$ AND the destination row $D_R$ is less than the source row $S_R$ AND the destination level $D_L$ is less than to the source level $S_L$. If the outcome of decision block 1014 is positive then the process 800 proceeds to block 1016 in which the next hop address is set to the source ID minus N times M minus N ($S_{ID}$−NM−N).

If the outcome of decision block 1014 is negative, the process 800 proceeds to decision block 1018 which tests if the destination column $D_C$ is greater than the source column $S_C$ AND the destination row $D_R$ is equal to the source row $S_R$ AND the destination level $D_L$ is greater than to the source level $S_L$. If the outcome of decision block 1018 is positive then the process 800 proceeds to block 1020 in which the next hop address is set to the source ID plus N times M plus one ($S_{ID}$+NM+1).

If the outcome of decision block 1018 is negative, the process 800 proceeds to decision block 1022 which tests if the destination column $D_C$ is greater than the source column $S_C$ AND the destination row $D_R$ is equal to the source row $S_R$ AND the destination level $D_L$ is greater than to the source level $S_L$. If the outcome of decision block 1022 is positive then the process 800 proceeds to block 1024 in which the next hop address is set to the source ID plus N times M minus one ($S_{ID}$+NM−1).

If the outcome of decision block 1022 is negative, the process 800 proceeds to decision block 1026 which tests if the destination column $D_C$ is greater than the source column $S_C$ AND the destination row $D_R$ is equal to the source row $S_R$ AND the destination level $D_L$ is less than to the source level $S_L$. If the outcome of decision block 1026 is positive then the process 800 proceeds to block 1028 in which the next hop address is set to the source ID minus N times M plus one ($S_{ID}$−NM+1).

If the outcome of decision block 1026 is negative, the process 800 proceeds to block 1030 in which the next hop address is set to the source ID minus N times M minus one ($S_{ID}$−NM−1). The negative outcome of decision block 1026 corresponds to a case in which the destination column $D_C$ is less than the source column $S_C$ AND the destination row $D_R$ is equal to the source row $S_R$ AND the destination level $D_L$ is less than to the source level $S_L$.

After executing blocks 810, 814, 818. 822, 826, 830, 834, 836, 904, 908, 912, 914, 920, 924, 928, 932, 936, 940, 1004, 1006, 1008, 1012, 1016, 1020, 1024, 1028 the process 800 continues with block 602 of process 500 which is described herein above.

The Boolean OR used herein is an inclusive Boolean OR.

Numerous modifications and variations of the present invention are possible in light of the above teachings. It is therefore to be understood that within the scope of the appended claims, the invention may be practiced otherwise than as specifically described herein.

What is claimed is:

1. A method for routing a message at a wireless node in a wireless network having a grid topology, the wireless node having a source identification number $S_{ID}$ and located at a column $S_C$ and a row $S_R$ of the wireless network, the method comprising:
- receiving, by a wireless transceiver, a message including a first next hop address and a destination node identification number, $D_{ID}$ carried in a first wireless signal, the message carrying data generated from a sensor in the wireless network;
- wherein the wireless transceiver comprises the processing circuitry and a memory, an input/output interface, a signal bus and an antenna, wherein the wireless transceiver, the input/output interface and the antenna are coupled together through the signal bus;
- determining, by a processing circuitry, whether the source identification number $S_{ID}$ is the same as the first next hop address; and
- when the source identification number $S_{ID}$ is the same as the first next hop address,
  - calculating, by the processing circuitry, a destination column $D_C$ and a destination row $D_R$ based on the destination node identification number $D_{ID}$,
  - determining, by the processing circuitry, a second next hop address of a next hop by comparing the destination column $D_C$, the destination row $D_R$, and the destination node identification number $D_{ID}$ with the column of the wireless node $S_C$, the row of the wireless node $S_R$, and the source identification number of the wireless node $S_{ID}$ without discovery of routes to other nodes in the wireless network and routing table maintenance, wherein the next hop node is one of neighboring nodes of the wireless node, and
  - transmitting, by the wireless transceiver, the message including the second next hop address to the next hop node on a second wireless signal,
- wherein the wireless network includes a plurality of wireless nodes that are arranged in columns and rows, and are sequentially assigned, row by row and column by column, with a sequence of identification numbers.

2. The method according to claim 1, wherein, calculating the destination column $D_C$ includes evaluating:

$$D_C = D_{ID} \bmod N,$$

where N is a number of logical columns into which the wireless is divided; and
calculating the destination row $D_R$ includes evaluating:

$$D_R = \mathrm{floor}(D_{ID}/N),$$

where N is a number of logical columns into which the wireless network is divided.

3. The method according to claim 2, wherein determining the second next hop address includes evaluating a plurality of Boolean expressions including inequalities based on the destination column and the destination row.

4. The method according to claim 3, wherein the plurality of Boolean expressions include inequalities based on the destination node identification number $D_{ID}$ and the source identification number of the wireless node $S_{ID}$.

5. The method according to claim 1, further comprising:
calculating a destination level $D_L$ based on the destination node identification number $D_{ID}$, wherein the wireless network has a three dimensional (3D) topology, and the plurality of wireless nodes that are arranged in columns, rows and levels, and are sequentially assigned, row by row, column by column, and level by level, with a sequence of identification numbers.

6. The method according to claim 5, wherein:
calculating the destination column $D_C$ includes evaluating:

$$D_C = D_{ID} \bmod N$$

where N is a number of logical columns into which the wireless is divided;
calculating the destination row $D_R$ includes evaluating:

$$D_R = (\mathrm{floor}(D_{ID}/N)) \bmod M$$

where M is a number of logical rows into which the wireless network is divided; and
calculating the destination level $D_L$ includes evaluating:

$$D_L = \mathrm{floor}(D_{ID}/(NM)).$$

* * * * *